Dec. 3, 1929.   P. L. STENMAN   1,737,739
MACHINE FOR CUTTING THREADS UPON SCREW BLANKS
Filed Oct. 11, 1923

Per Leonard Stenman
INVENTOR

Patented Dec. 3, 1929

1,737,739

UNITED STATES PATENT OFFICE

PER LEONARD STENMAN, OF STOCKHOLM, SWEDEN

MACHINE FOR CUTTING THREADS UPON SCREW BLANKS

Application filed October 11, 1923, Serial No. 667,818, and in Sweden October 18, 1922.

My invention relates to the manufacture of screws, and has particular reference to an improved apparatus for this purpose utilizing a plurality of cutting tools.

An object of the invention is to provide means for cutting the threads upon screw blanks in the course of a single operation, whereby the capacity of the machines will be greatly increased and the cost of manufacture correspondingly reduced.

I achieve this object by providing a plurality of cutting tools, each one of which may have one or more cutting edges, and means for causing relative movement of the tools and the screw blank so that the tools will follow each other in succession through the initial cut made by the first tool, thereby completing the entire threading operation during only one movement of the tools across the screw blank. For this purpose I provide means for advancing the tools in succession to the screw blank and further means for causing an effective movement of the tools longitudinally along the blank.

A further object of the invention is to provide means for cutting screws of any desired periphery such as wood screws and machine screws, and for this purpose I provide an arrangement for moving the tools relatively to each other in a direction toward and away from the center of the blank.

I provide still further means for effectively withdrawing the tools in succession from the working position, by an upward or downward swing, or by a retractive movement, and returning them to their original positions after the operation is complete.

With these objects in view I have constructed several embodiments of a device embodying these features which are described hereinafter, and to make the nature of the invention clear reference will be had to the accompanying drawings which illustratively exemplify various embodiments of my invention.

Figure 1:
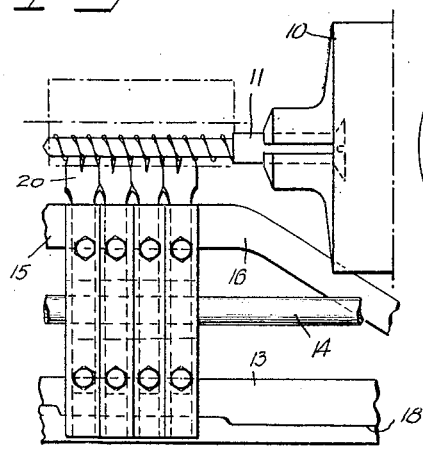
Fig. 1 is a plan view of one form of apparatus constructed according to the invention, showing the tools in cutting position.
Figure 2:
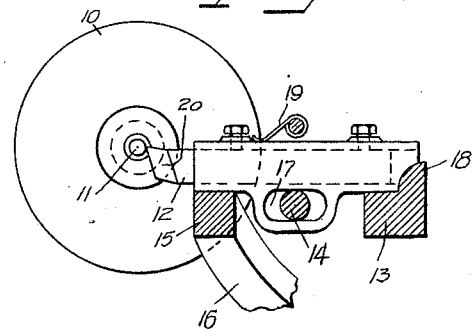
Fig. 2 is a side view of a portion of the same, looking in the direction of the screw, parts being shown in section.

Referring to the drawings, and particularly to Figs. 1 and 2, 10 denotes a chuck for holding a screw blank 11 in any suitable manner. Tools 12, of suitable form, are mounted side by side upon a guide rail 13, a guide shaft 14, and a guide member 15. The latter supports the forward ends of the tools and is preferably curved at suitable points to guide the forward ends of the tools into proper position. Thus, a downwardly curved portion 16 is provided adjacent the chuck so that the tools will be guided past the chuck without encountering it. The tools are provided with elongated openings 17 through which the guide shaft 14 passes, the latter serving as a fulcrum support for the center portions of the tools. The guide rail 13 supports the rear portions of the tools and is provided with a raised rail portion 18 against which the rear ends of the tools bear, this rail portion serving as a guide for the movement of the tools parallel to themselves. The elongation of the openings 17 allows such movement to take place.

A spring 19 is preferably provided above each tool to bear down on the forward end thereof to hold it in firm, yet slidable, contact with guide member 15.

In operation, the tools are moved sucessively by any suitable means (not shown) from the left toward the right (in Fig. 1) whereby the curvature of the member 15 will bring them successively at the proper time up to the proper height for cutting. The tools may have one or more cutting edges 20, those shown in Fig. 1 having two. The speed of rotation of the screw blank is of course so timed relative to the movement of the tools along the axis thereof that each successive tool will enter and follow the initial helix cut by the first tool. The rail portion 18 serves to advance or withdraw the tools individually by means of springs not illustrated and at the proper times in a direction parallel to themselves for the purpose of pointing the screw, clearing the shank, or as shown in Fig. 4, shaping the periphery of the screw to any desired form.

Figure 3:
Figs. 3 and 4 are end and plan views respectively of another modification.
Figure 4:
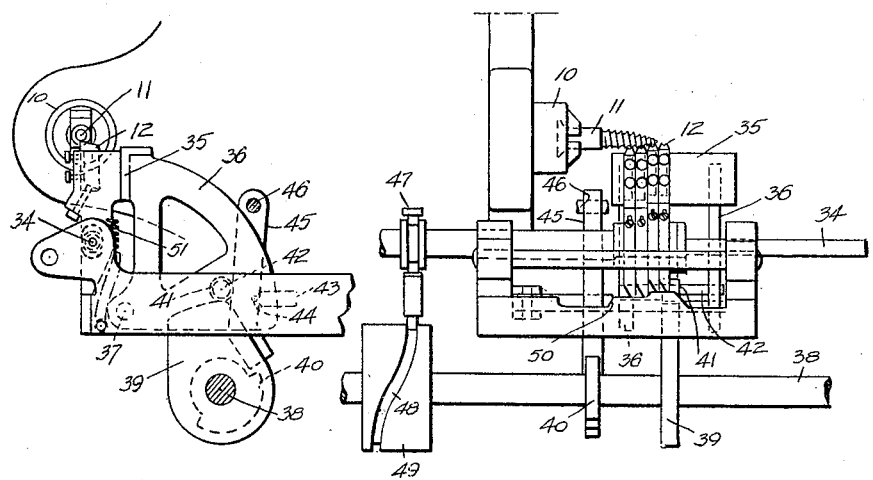

According to the modified embodiment illustrated in Figs. 3 and 4, the tools are mounted upon a shaft 34 and rest upon a guiding surface 35 which may be suitably curved for the purpose hereinbefore described. After the tools have completed their work they are brought back to initial position by causing the entire guiding surface 35 to move bodily out of operative position. For this purpose it is mounted on a cradle arrangement comprising laterally disposed supporting quadrants 36 pivotally supported on a spindle 37. On a shaft 38 in operative timed connection with the machine are mounted cams 39 and 40 which control the rocking movement of the cradle and hence of the surface 35 about the spindle 37. Thus, the cam 39 is designed to act upon a roller 41 carried by a shaft 42 which extends between the quadrants 36 for the purpose of bringing the surface 35 (and hence the tools) into working position. In this latter position the cradle arrangement is locked by means of a pin 43 which is carried by the framework and engages in a notch 44 in the cradle. To disengage the pin 43, I prefer to provide a lever 45 pivoted to the framework at 46, co-operating near its free end with the pin 43 and engaged at its end by the cam 40. The latter depresses the lever 45 at a predetermined instant whereby the pin 43 is released and the cradle arrangement allowed to fall out of working position. Any other suitable mechanical device may of course be utilized for temporarily locking and at pre-determined moments releasing the cradle.

The tools having been moved along the screw blank by the shaft 34, they are now returned to their original position by a reverse motion of said shaft. This reciprocating motion of shaft 34 is in timed relation to the rotation of the blank and may be effected by any suitable means such as for example a collar and fork engagement 47 wherein the fork is guided in a cylindrical cam slot 48 in a cam 49 mounted on and driven by shaft 38. A suitable guide 50 for the rear ends of the tools corresponds with and fulfils the same function as the rail 18 in Fig. 1, and the tools are constrained to follow the curvature of the guide 50 by means of springs 51 or the like which yieldably urge the tools rearwardly against the guide.

It will of course be evident that various modifications of the device may be made, and various mechanical expedients used in place of those described and illustrated herein for the purpose of explaining the nature of my invention, without departing from the spirit and scope of the invention, as expressed in the appended claims.

What I claim is:

1. In a machine for cutting threads upon a screw blank, a plurality of cutting tools disposed parallel to each other and means for simultaneously moving said tools successively in a longitudinal and independently transverse direction from the point towards the head of the blank, said means comprising a guide member and a guide rail for supporting the forward and rearward portions of the tools respectively, and a guide shaft pivotally supporting the midportions thereof.

2. In a machine for cutting threads upon a screw blank, a plurality of cutting tools disposed parallel to each other and means for simultaneously moving said tools successively in a longitudinal and independently transverse direction from the point towards the head of the blank, said means comprising a guide member and a guide rail for supporting the forward and rearward portions of the tools respectively, and a guide shaft pivotally supporting the mid-portions thereof, said guide rail having a raised rail portion constituting a cam surface engaging the ends of the tools to guide them in a direction parallel to themselves.

In testimony whereof, I have signed my name to this specification.

PER LEONARD STENMAN.